United States Patent [19]  [11] 4,348,464
Khoury  [45] Sep. 7, 1982

[54] COMBINATION SCORE TOOL AND SCORE ANVIL

[75] Inventor: Nick S. Khoury, Worth, Ill.

[73] Assignee: The Continental Group, Inc., New York, N.Y.

[21] Appl. No.: 964,760

[22] Filed: Nov. 29, 1978

[51] Int. Cl.³ .............................................. B22F 7/00
[52] U.S. Cl. .................................... 428/571; 428/572; 72/324; 413/17
[58] Field of Search ................. 428/571, 572; 72/324; 113/15 A; 15 R; 225/96; 83/879, 880

[56] References Cited

U.S. PATENT DOCUMENTS

| 3,359,773 | 12/1967 | Stuchbery | 83/879 |
| 3,650,006 | 3/1972 | Kinkel | 113/15 A |
| 3,688,718 | 9/1972 | Schrecker | 113/15 A |
| 3,728,980 | 4/1973 | Fraze | 83/879 |
| 3,946,683 | 3/1976 | Jordan | 113/15 A |
| 4,122,791 | 10/1978 | Brown | 113/15 A |
| 4,149,479 | 4/1979 | Zundel | 113/15 A X |
| 4,216,736 | 8/1980 | Westphal | 113/15 A |

Primary Examiner—Joseph L. Schofer
Assistant Examiner—J. L. Barr
Attorney, Agent, or Firm—Charles E. Brown

[57] ABSTRACT

A scoring tool combination wherein the score anvil is provided with a pair of transversely spaced generally rounded material compressing ribs disposed on opposite sides of the scoring rib of the score tool. The material compressing ribs compress the material of the sheet being scored on opposite sides of the score so as to strengthen the sheet and thus permit deeper scoring and lesser score residuals without failure due to cracking. The material compressing ribs also control coating damage and exposed metal areas.

12 Claims, 5 Drawing Figures

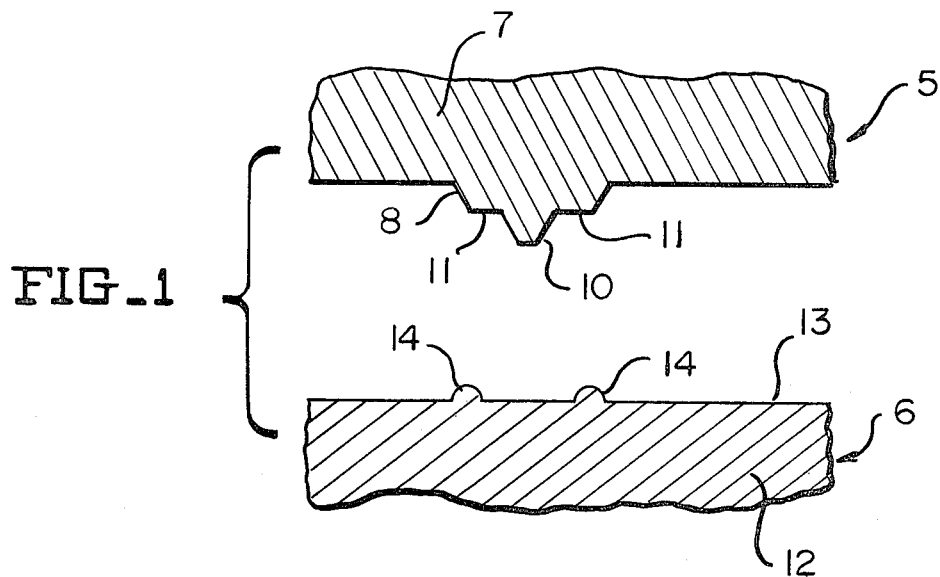
FIG_1
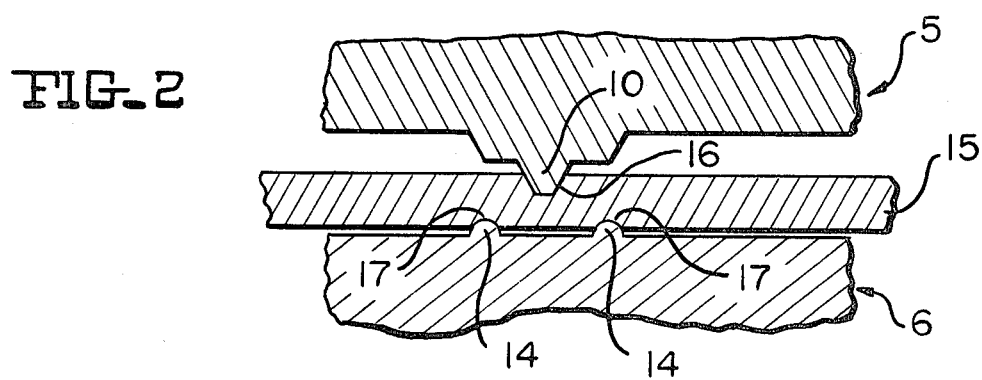
FIG_2
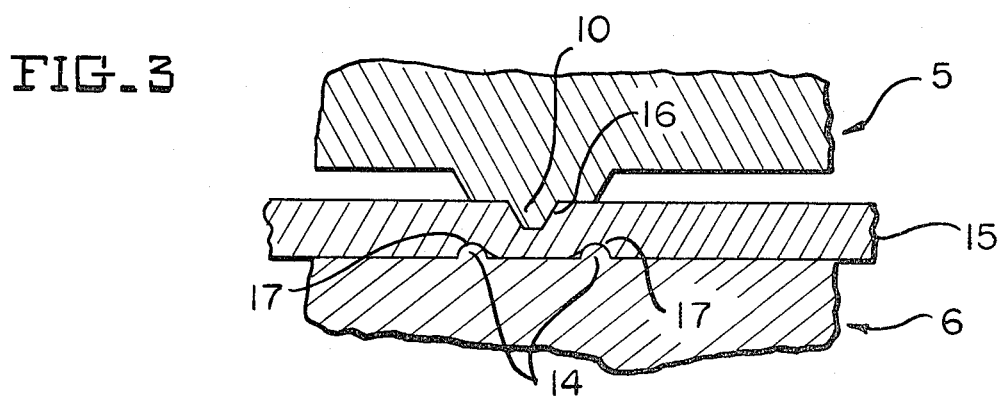
FIG_3

COMBINATION SCORE TOOL AND SCORE ANVIL

This invention relates in general to new and useful improvements in the formation of scores in metal sheets to effect the controlled rupture of such metal sheets.

It is customary to define lines of weakening in metal sheets, particularly container panels, whereby a panel portion or a strip may be readily torn from the metal sheet to effect separation of portions of the metal sheet for opening of an associated container. Scoring is normally effected by means of a scoring die which compressively displaces metal as opposed to the removal of metal such as by cutting or like action. The net result is that there is working of the metal due to the displacement thereof, and difficulties have been experienced in obtaining a desired score residual without fracture.

In accordance with this invention, it is proposed to modify the normal flat anvil by providing an anvil with a pair of ribs spaced transversely relative to the general direction of the scoring tool, with these ribs being effective during the scoring operation to compress the metal on opposite sides of the score.

Most particularly, the anvil having the metal compressing ribs thereon has the ribs spaced apart and so aligned with respect to the score tool projecting rib as to be substantially equally spaced on opposite sides thereof.

A further difficulty which has been experienced in the normal scoring of container components is that at least the undersurface of the container component is coated and during the scoring thereof this coating is frequently ruptured over a relatively large area and requires repair. In accordance with this invention, the metal compressing ribs on the score anvil restrict the metal exposure due to coating rupture.

Most particularly, the ribs on the score anvil place the score area in compression on opposite sides of the score and serve to effect a strengthening of the metal adjacent the score so as to provide for a uniform strength in the score residual. By so compressing the metal sheet during the score forming operation, the neutral axis of the sheet gently curves toward the sheet surface on which the score is formed, down around the score and then back toward the sheet surface. Additionally, the lines of metal flow are maintained substantially parallel to the neutral axis as opposed to flow toward the deepest penetration area and to the far side of the score as occurs with the conventional practice. This permits a deeper score with less possibility of accidental fracture. Further, higher forces are required to fracture and tear the sheet along the score.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a sectional view through a typical score tool and score anvil formed in accordance with this invention.

FIG. 2 is a sectional view similar to FIG. 1, showing a metal sheet positioned between the score tool and score anvil in an intermediate scoring position.

FIG. 3 is a further fragmentary sectional view showing the relationship of the score tool and score anvil at the completion of the scoring step.

Figure 4:
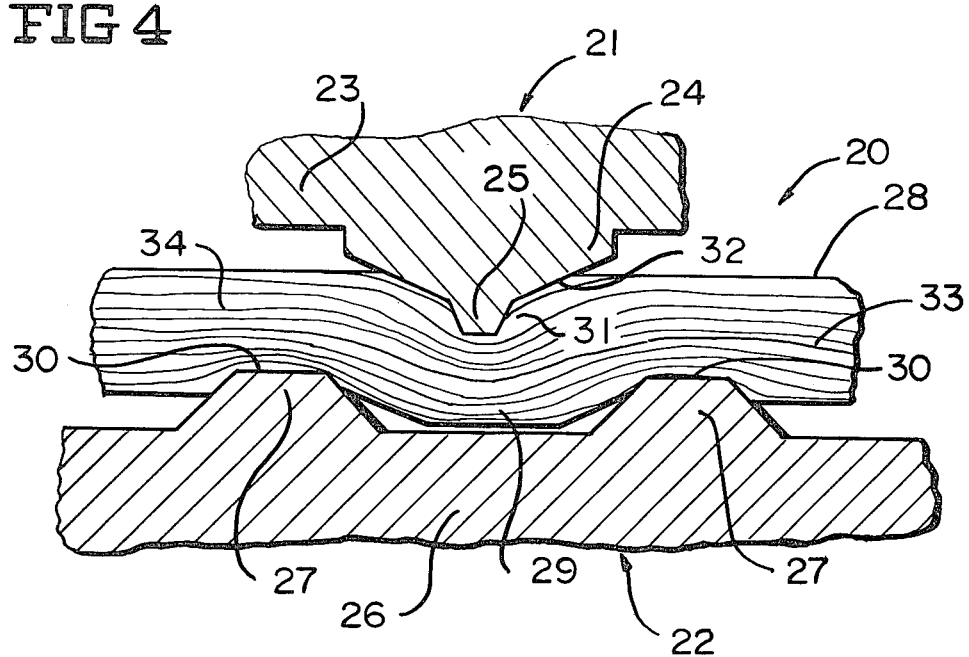
FIG. 4 is a sectional view taken through a modified form of tooling, and shows specifically the cross section of the sheet in the scored area including the neutral axis and the flow lines.

Referrng now to the drawings in detail, it will be seen that there is illustrated in FIG. 1 a score tool generally identified by the numeral 5 and a score anvil generally identified by the numeral 6.

The score tool 5 is of a conventional construction and includes a base 7 having a relatively wide back-up rib 8 projecting therefrom, with the rib 8 in turn having projecting therefrom a scoring rib 10. On opposite sides of the scoring rib 10, the rib 8 presents lands 11. The scoring rib 10 is of a generally trapezoidal cross section and will vary in dimensions in accordance with the desired cross section of the score.

The score anvil 6 includes a base 12 having an upper surface 13 on which the metal sheet or container component to be scored normally rests. The score anvil 6, however, is modified to the extent that it is provided with two material compressing ribs 14 which are spaced apart from one another so that they generally oppose the remote end of the lands 11. The ribs 14 are of a rounded configuration and are generally of a semicircular cross section. It is to be understood that the ribs 14 are centered relative to the rib 10.

Referring now to FIG. 2, it will be seen that a metal sheet 15, which may be part of a container component such as an end unit, is positioned between the score tool 5 and the score anvil 6 and a scoring operation has been initiated. The scoring rib 10 has entered the upper surface of the sheet 15 to initiate the formation of a score 16. At the same time, the ribs 14 have compressively engaged the under surface of the sheet 15 on opposite sides of the score 16 so as to compress the metal within the sheet. The ribs 14 have initiated the formation of narrow recesses 17 on the underside of the sheet 15.

As the score tool 5 and the score anvil 6 continue to move together until the scoring operation is completed, the scoring rib 10 and the material compressing ribs 14 continue to penetrate the sheet 15 until the scoring is completed as shown in FIG. 3.

It will be apparent that the compressing of the metal of the sheet 15 on opposite sides of the score 16 by the material compressing ribs 14 provides for a strengthening of the sheet in the scored area, thus assuring a controlled strength of the sheet 15 in the area of the score residual. The net result is that it is possible to penetrate the sheet 15 to a lower score residual without failure than in the case of a like score tool 5 and a flat surface score anvil. This, at the same time, provides for increased manufacturing latitude.

The metal compressing ribs 14 also serve to restrict the area of coating damage and resultant metal exposure, and thus facilitate later repair. This is also a major factor.

Reference is now made to FIG. 4 wherein there is illustrated a scoring operation formed in accordance with this invention, with a slightly differently configurated tooling generally identified by the numeral 20. The tooling 20 includes a score tool 21 and a score anvil 22. The score tool 21 includes a base 23 having a relatively wide and tapering back-up rib 24 from which a scoring rib 25 projects. The scoring rib 25 is generally wedge shaped or trapezoidal in outline.

The score anvil 22 also includes a base 26. Projecting from the upper surface of the base 26 are two material compressing ribs 27 which are also of a generally wedge shaped trapezoidal cross section. It will be seen that the ribs 27 have their sheet engaging surfaces disposed outwardly of the back-up rib 24.

When a sheet, such as a sheet 28, is scored utilizing the tooling 20, it will be seen that the sheet 28 is curved downwardly as at 29 between the two ribs 27. At the same time the ribs 27 penetrate the undersurface of the sheet 28 so as to form therein recesses 30 which are disposed on opposite sides of and are spaced from a score 31 formed by the scoring tool 21. It is to be noted that the score 31 also has a gradually increasing in width outer portion 32 which is in part formed by the back-up rib 24.

It will be seen that in the forming of the score 31, not only is the sheet 28 generally curved as at 29, but also the neutral axis 33 of the sheet 28 gently curves up above the compression ribs 27 and down below the score 31. In addition, it will be seen that flow lines 34 in the sheet 28 remain parallel to the neutral axis 33 and that there is a minimal crowding of the flow lines adjacent the score 31 as compared to the shifting of the flow lines away from the scoring tool in conventional practice.

It has been found that because of the uniform compressing of the metal on opposite sides of the sheet 28 during the forming of the score 31, it is possible to score deeper with less chance of fracturing. Also, higher forces are required to fracture and tear the sheet along the score.

Figure 5:
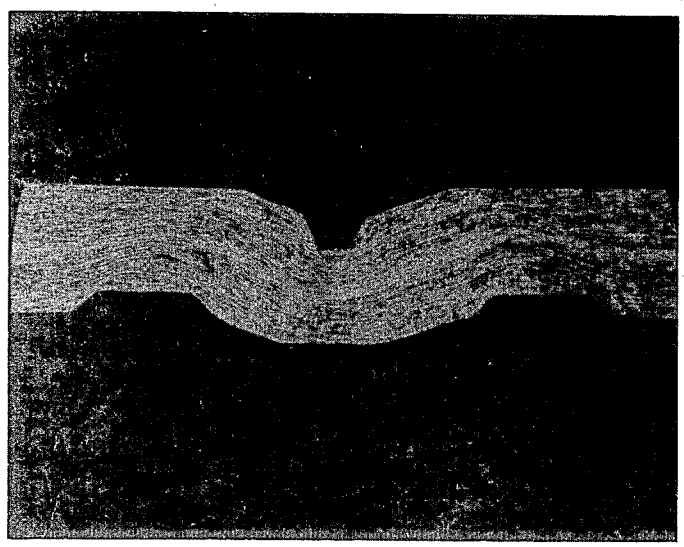
FIG. 5 is a photomicrograph of the scored sheet of FIG. 4, and shows both the gentle curve of the neutral axis and the positioning of the flow lines generally parallel to the neutral axis.

The above discussed gentle curving of the neutral axis 33 and the position of the flow lines 34 adjacent the neutral axis is clearly evident from the photomicrograph of FIG. 5.

Although only a preferred embodiment of the invention has been specifically illustrated and described herein, it is to be understood that minor variations may be made in the scoring tool components without departing from the spirit and scope of the invention as defined by the appended claims.

I claim:

1. The combination of a score tool and score anvil wherein said score tool has a projecting rib for effecting scoring, said anvil has an article supporting surface and two spaced apart metal compressing ribs projecting from said supporting surface and generally opposing said scoring rib, and said scoring rib being positioned intermediate said compressing ribs for initially supporting an article to be scored.

2. The combination of claim 1 wherein said compressing ribs are of a rounded generally semicircular cross section.

3. The combination of claim 3 wherein said score tool has a score limiting work engaging surface generally opposing said compressing ribs.

4. The combination of claim 1 wherein said score tool has a score limiting work engaging surface generally opposing said compressing ribs.

5. The combination of claim 1 wherein said compressing ribs are of a generally wedge shaped trapezoidal cross section.

6. A method of forming a weakening line in a metal sheet comprising the steps of pressing a score in one surface of the sheet, and simultaneously compressing the material of the same sheet at the opposite surface thereof and separately opposite sides of the score.

7. The method of claim 6 wherein the compressing of the sheet at the opposite surface thereof is effected by forcibly indenting the sheet.

8. The method of claim 7 wherein said sheet has a neutral axis; and said neutral axis is gently curved up towards said sheet one surface, down around the score, and then up towards said sheet one surface in the forming of the weakening line.

9. A scored sheet comprising a metal sheet having a weakening line therein defined by a score pressed into one surface of said sheet, and said sheet having the material thereof separately compressively stressed on opposite sides of said score by an inwardly depressing of the sheet at two spaced locations on the opposite surface thereof.

10. The scored sheet of claim 9 wherein said sheet has a neutral axis; and said neutral axis gently curves up towards said sheet one surface, down around the score, and then up towards said sheet one surface in the forming of the weakening line.

11. The score sheet of claim 10 wherein said sheet has flow lines therein when viewed in section normal to said score with said flow lines generally paralleling said neutral axis.

12. A method of forming a weakening line in a metal sheet to facilitate later controlled fracture of said metal sheet along said weakening line, said method comprising the steps of compressing one surface of a metal sheet on opposite sides of a preselected intended line of fracture, and scoring the opposite surface of the sheet between said compressed areas.

* * * * *